No. 741,016. Patented October 13, 1903.

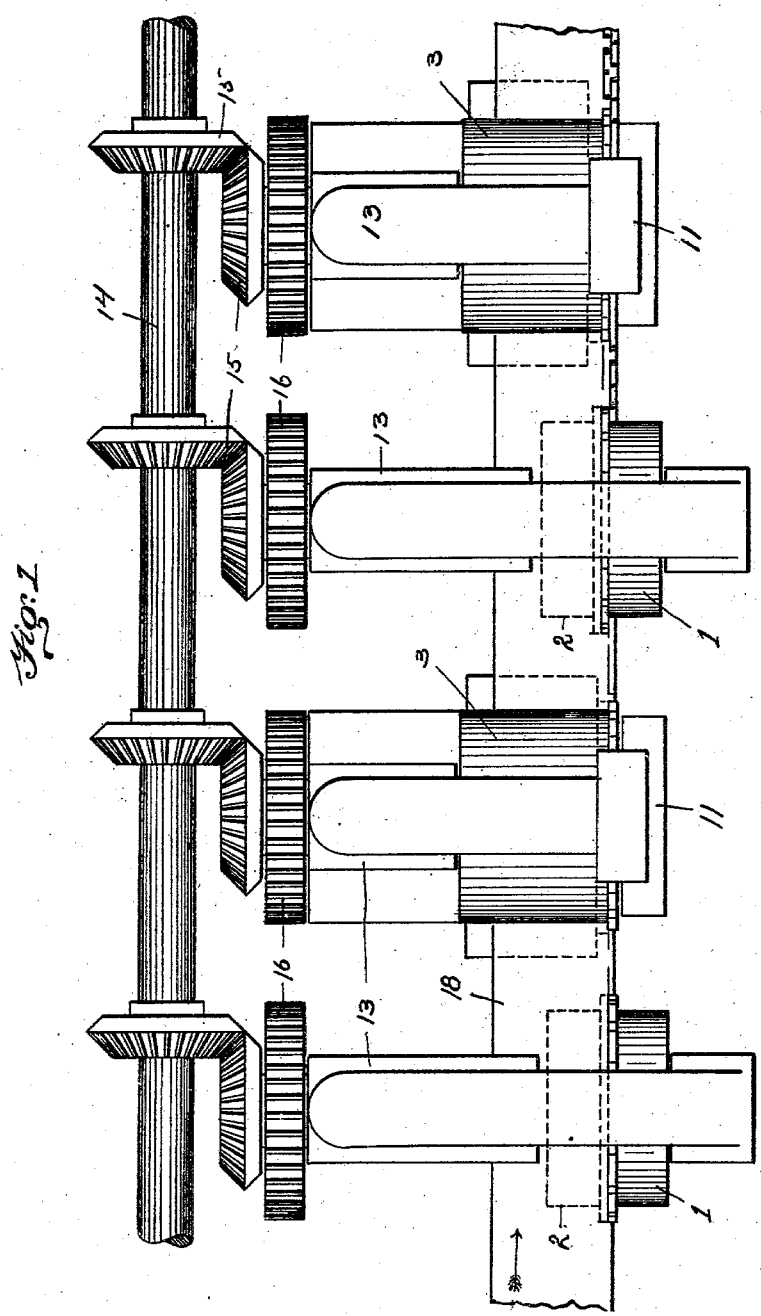

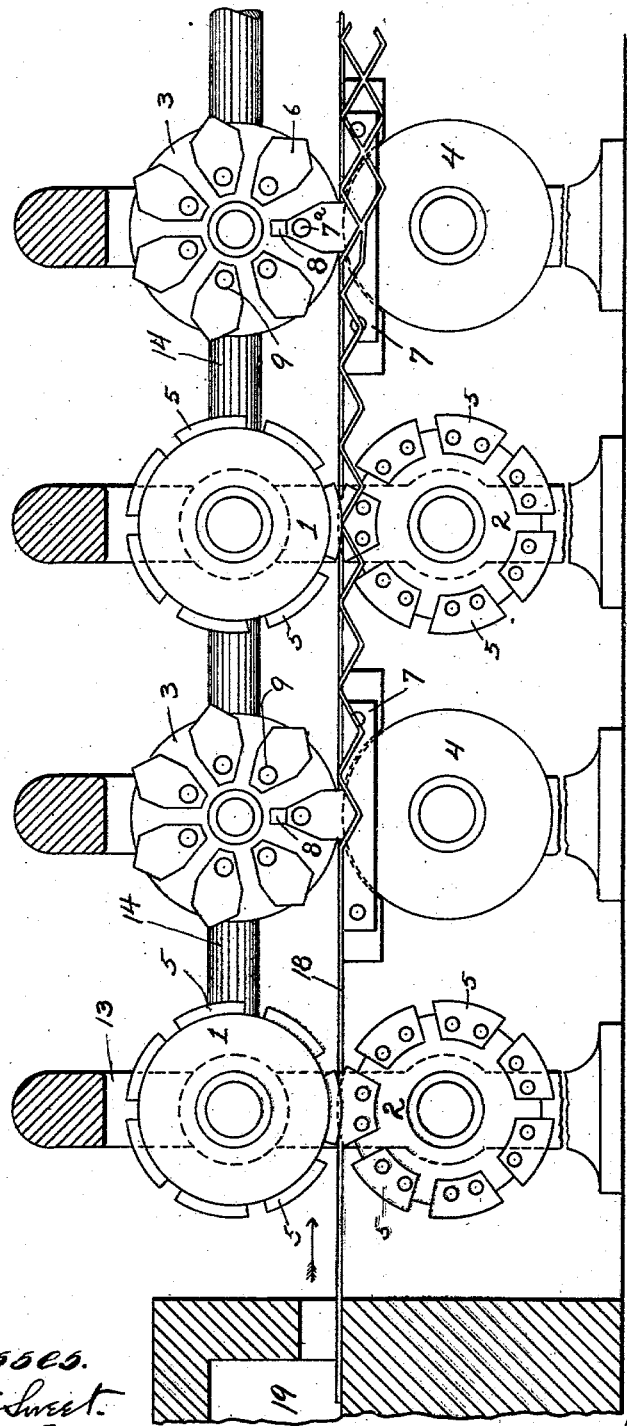

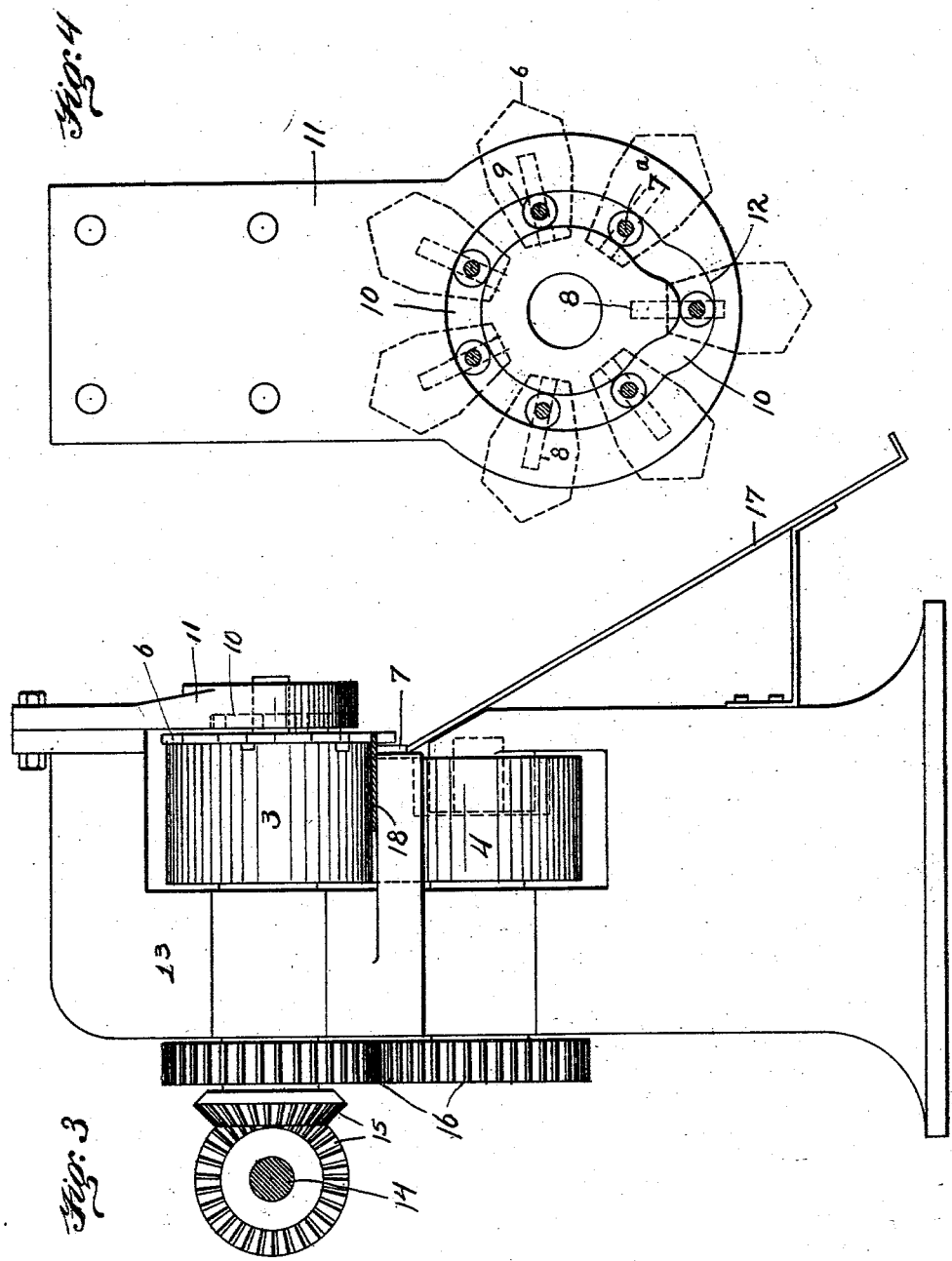

UNITED STATES PATENT OFFICE.

JAMES F. CRAVEN, OF PITTSBURG, PENNSYLVANIA, ASSIGNOR TO McDOWELL MANUFACTURING COMPANY, OF PITTSBURG, PENNSYLVANIA, A CORPORATION OF PENNSYLVANIA.

MACHINE FOR MAKING EXPANDED METAL.

SPECIFICATION forming part of Letters Patent No. 741,016, dated October 13, 1903.

Application filed February 26, 1903. Serial No. 145,202. (No model.)

*To all whom it may concern:*

Be it known that I, JAMES F. CRAVEN, a resident of Pittsburg, in the county of Allegheny and State of Pennsylvania, have invented a new and useful Improvement in Machines for Making Expanded Metal; and I do hereby declare the following to be a full, clear, and exact description thereof.

My invention relates to apparatus for making expanded metal; and its object is to provide apparatus for this purpose whereby expanded metal having a true diamond mesh can be made much more expeditiously than heretofore.

Expanded metal of true diamond mesh, as far as I know, is now exclusively made by means of a press provided with a series of longitudinally-arranged knives which reciprocate in a vertical direction and coöperate with suitable anvils. A plate of limited length and suitable width is fed sidewise step by step to the press, and the knives at each descent slit the plate parallel to its length and expand the portions thereof outside the slits. This operation is very slow, since it requires a large number of reciprocations of the press to expand the full width of an ordinary plate. Furthermore, there are practical limits to the length of the press, and consequently to the size of plates that can be expanded thereby.

It has been attempted to make metal lathing which is in the nature of expanded metal from comparatively thin sheet metal by means of a series of sets of rollers each provided with a series of radial triangular projections which slit and simultaneously expand the metal. By means of such a machine the plate can be worked up much more expeditiously than on a reciprocating press; but it has been found that these machines are incapable of producing a true diamond mesh, this being due to the fact that the points or apices of the projections travel at a greater speed than the plate. This will be readily understood when it is considered that the plate travels at a rate corresponding to the peripheral speed of the working face of the roll, whereas the slitting and expanding portions project beyond this working face, and consequently are on a longer radius, so that during a given interval of time they travel a longer distance than the plate. As a consequence these slitting projections slit the plate in their movement forward relative to the plate, thus producing a slit which is longer than is absolutely necessary and causing the strands of the several diamonds to be out of line with each other, so that a true mesh is not formed. This defect while not serious for metal lathing is fatal for all ornamental work or for expanded metal to be used in concrete or other building structures where strength is required.

The object of my invention is to provide apparatus whereby expanded metal having a true diamond mesh can be made as expeditiously as lathing is made at present.

To this end the invention consists, generally stated, in a series of slitting and expanding tools comprising rolls or disks having thereon slitting and expanding devices which, or at least the expanding devices, have a radial movement on their carrying rolls or disks, so that they will have a movement practically at right angles to the plate being expanded. In this way I not only secure the rapidity of action of the rotary tools, but also avoid the greater circumferential speed of the slitting and expanding devices, so that the slit will not be formed longer than is absolutely necessary and a true diamond mesh produced.

The invention also consists in certain details of construction hereinafter described and claimed.

In the accompanying drawings, Figure 1 is a plan view showing diagrammatically a section of machine constructed according to my invention. Fig. 2 is a side elevation thereof. Fig. 3 is an end elevation of the expanding-rolls, and Fig. 4 is a rear side view of the latter.

According to my invention the slitting and expanding may be done simultaneously—that is, by suitable devices which both slit and expand the metal—or the slitting may be done prior to the expanding. The latter is the arrangement shown in the drawings; but I wish it understood that my invention is not limited to this arrangement, but covers equally as well an arrangement wherein the slitting and expanding are both done by the same set of rolls.

In my apparatus the slitting and expanding tools are formed on the periphery of or carried by suitable rolls or disks, and each set of tools in the form shown in the drawings comprises a pair of slitting-disks 1 and 2 and a pair of expanding-disks 3 and 4, arranged in tandem, so that the plate is first slit and then expanded. In the drawings only two sets of such slitting and expanding tools are shown; but it will be understood that there will be a series of such sets of endless tools arranged one set in advance of the other and preferably in stepwise relation, so that the series form practically a diagonal line which will begin the slitting and expanding at one edge of the sheet and which continue the same stepwise across the full length thereof. The tools, however, may be placed in line, and by feeding the plate diagonally sidewise and forward the same result is produced.

The slitting-disks 1 and 2 carry a series of coöperating knives 5, arranged around the peripheries of said disks, with spaces between adjacent knives, so that in the rotation of said disks the plate will be given a series of short slits in line with each other.

The upper expanding-disks 3 each carry one or more radially-arranged expanders 6, and the lower disk 4 has a plain periphery and serves merely to support the plate and feed it forward. Just outside of the disk 4 at its upper portion is a stationary anvil 7, over the edge of which the slit portion of the plate is expanded by the expanders 6 on the disk 3. The expanding-tools 6 are so mounted on the disks 3 as to have a radial movement relative thereto, and means are provided for projecting said tools when they reach their lowermost vertical position and are acting on the plate to expand the same, so that the expanding is done by a movement practically perpendicular to the plane of the plate. Various arrangements of mechanism may be employed for giving such radial movement to the expanders. As shown in the drawings, the expanders are each provided with a stud 7ª, extending through a radial slot 8 in the disk 3 and carrying at its inner end a roller 9, which runs in a cam-groove 10, formed in a stationary member 11. The cam-groove 10 is concentric with the disk 3 for most of its course, but has a downwardly-dipping portion 12 at its lower side, which will force the expanders downwardly while acting on the plate. As a consequence the expanding is done by a movement at right angles to the plate, and there is practically no movement of the expanders longitudinally of the plate while they are acting, as is the case when the expanders are fixed to the disk.

Each of the disks 1 and 2 and 3 and 4 is provided with a shaft mounted in bearings in suitable housings or frames 13, the bearings for the top disks preferably overhanging the housings or frames, as shown. All of the disks are positively rotated by any suitable gearing and from any suitable source of power, such as from the counter-shaft 14, connected by bevel-gears 15 with the shaft of one of the disks of each pair, the shafts of each pair of disks being connected by spur-gears 16. Brackets or guides 17 are provided to support and guide the expanded sheet.

The operation of my apparatus is as follows: The plate to be expanded is shown at 18, and in order to save power it is preferably first heated, and this can be accomplished in a suitable furnace, such as shown at 19. The heated plate is fed endwise through the series of disks in the direction indicated by the arrow. The first set of slitting-disks cut slits parallel to the outer edge of the plate, and the succeeding expanding-disk of that set presses the portion of the metal lying outside of the slits downwardly and expands the same. The second set of slitting-disks cut a series of slits parallel to the first series of slits, and the expanding-disk of that set expands the metal lying outside of the same, and the slitting-disks of each set in succession cut a series of slits always at the outer edge of the expanded portion of the plate, and the succeeding expanding-disks expand the portions of metal lying outside of said slits. As the sets of disks are either arranged in stepwise relation or as the plate is fed diagonally sidewise and forwardly, the slitting and expanding take place progressively from the outer to the inner edge of the plate until the entire plate is worked up. Inasmuch as the upper disks are mounted on overhanging shafts, the expanded portion of the metal can unobstructedly fall down and out of the way, being guided and supported on the brackets 17. During the rotation of the disks 3 the expanders 6 are held in their retracted position during most of their course or as long as the rollers 9 run in the concentric portions of the cam-grooves 10. When said rollers, however, enter the downwardly-dipping portion 12 of the cam-grooves, the expanders are forced out radially and downwardly practically at right angles to the plate being expanded, and as soon as the expansion is fully accomplished the expanders are again retracted by the cam-groove 10, so that practically no movement of the expanders longitudinal of the plate occurs. The expanding therefore is accomplished practically in the same manner as with the reciprocating presses heretofore in use; but the tools are endless ones, so that rapidity of operation is secured, but nevertheless a true diamond mesh is formed.

The slitting-rolls 1 and 2 can be dispensed with by merely making the expanders 6 and anvil 4 with comparatively sharp edges, so that they will serve to shear the plate as well as expand the same. In that event the radially-moving tools 6 will be not only expanding-tools, but also slitting-tools, and I intend by the term "expanding devices" as used in the claims to include not only devices which expand only, but also devices which both slit and expand. The slitting-tools on the disks 1 and 2 might be made radially movable in the same manner as the expanding-tools 6; but this generally will not be necessary.

What I claim as my invention, and desire to secure by Letters Patent, is—

1. In a machine for forming expanded metal, the combination of a series of disks or rolls, means for rotating the same, one or more expanding devices carried by each of said rolls, and means for moving said expanding device or devices radially on the disk or roll.

2. In a machine for forming expanded metal, the combination of a series of disks or rolls, means for rotating the same, one or more expanding devices carried by each roll, means for moving said expanding device or devices radially on the disk or roll, a stationary anvil coöperating with said expanding device, and a feeding roll or disk coöperating with the expanding roll or disk.

3. In a machine for forming expanded metal, the combination of a series of disks or rolls, means for rotating the same, one or more expanding devices carried by each of said rolls, and a stationary cam with which said expanding device or devices engage, and arranged to move said expanding device or devices radially on the disk or roll as said expanding device approaches the plate to be expanded.

4. In a machine for forming expanded metal, the combination with means for slitting a plate, of a series of disks or rolls, means for rotating the same, one or more expanding devices carried by each roll, and means for moving said expanding device or devices radially on the disk or roll.

5. In a machine for forming expanded metal, the combination of a series of sets of slitting and expanding devices, each set comprising a pair of coöperating slitting-rolls and an expanding roll or disk, one or more expanding devices carried by said expanding roll or disk, and means for moving said expanding device or devices radially on the roll or disk.

6. In a machine for forming expanded metal, the combination of a series of disks or rolls, a stationary anvil coöperating with each of said rolls, a series of radially-movable expanding devices carried by each roll, and a stationary cam with which said expanding devices engage, said cam being concentric with the roll for most of its course and having a downwardly-dipping portion at its lower side.

In testimony whereof I, the said JAMES F. CRAVEN, have hereunto set my hand.

JAMES F. CRAVEN.

Witnesses:
G. C. RAYMOND,
ROBERT C. TOTTEN.